(12) United States Patent
Kondou et al.

(10) Patent No.: US 11,646,141 B2
(45) Date of Patent: May 9, 2023

(54) SOLENOID VALVE

(71) Applicant: DENSO CORPORATION, Kariya (JP)

(72) Inventors: Shinichi Kondou, Kariya (JP); Kazuhiro Sasao, Kariya (JP); Masato Arai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/474,441

(22) Filed: Sep. 14, 2021

(65) Prior Publication Data

US 2022/0084730 A1 Mar. 17, 2022

(30) Foreign Application Priority Data

Sep. 16, 2020 (JP) .............................. JP2020-155322

(51) Int. Cl.
| | | |
|---|---|---|
| *H01F 7/08* | (2006.01) | |
| *H01F 7/16* | (2006.01) | |
| *F16K 31/06* | (2006.01) | |

(52) U.S. Cl.
CPC ......... *H01F 7/081* (2013.01); *F16K 31/0613* (2013.01); *F16K 31/0675* (2013.01); *H01F 7/16* (2013.01); *H01F 2007/086* (2013.01)

(58) Field of Classification Search
CPC ............. F16K 31/0613; F16K 31/0675; F16K 27/048; H01F 7/16; H01F 2007/086
See application file for complete search history.

(56) References Cited

U.S. PATENT DOCUMENTS

| | | | | |
|---|---|---|---|---|
| 6,688,334 | B2* | 2/2004 | Kawamura | ......... F16K 31/0613 |
| | | | | 257/129 |
| 2005/0145811 | A1* | 7/2005 | Kondo | ............... F16K 31/0613 |
| | | | | 251/129.15 |
| 2006/0243938 | A1 | 11/2006 | Ishibashi et al. | |
| 2007/0158604 | A1* | 7/2007 | Kondo | ..................... F16K 11/07 |
| | | | | 251/129.15 |
| 2007/0158605 | A1* | 7/2007 | Murao | .................. F16K 31/061 |
| | | | | 137/625.65 |
| 2008/0315140 | A1* | 12/2008 | Hamaoka | .............. F01L 1/3442 |
| | | | | 251/129.15 |
| 2012/0056117 | A1* | 3/2012 | Nishinosono | ........... F16K 11/07 |
| | | | | 251/129.15 |
| 2013/0068975 | A1* | 3/2013 | Kondo | ...................... H01F 7/13 |
| | | | | 251/129.01 |
| 2014/0054485 | A1* | 2/2014 | Tomita | ............... G05D 16/2024 |
| | | | | 251/318 |
| 2018/0299025 | A1* | 10/2018 | Hilzendegen | ......... F16K 27/048 |
| 2021/0025514 | A1* | 1/2021 | Magel | ................. F16K 31/0675 |
| 2021/0048017 | A1* | 2/2021 | Kurihara | ............. F16K 31/0627 |

FOREIGN PATENT DOCUMENTS

WO   WO-2019009266 A1 *  1/2019  .......... F04B 27/1009

* cited by examiner

*Primary Examiner* — Jessica Cahill
(74) *Attorney, Agent, or Firm* — Nixon & Vanderhye P.C.

(57) ABSTRACT

A solenoid valve includes a valve portion and a solenoid portion. The valve portion has a sleeve and a valve body. The solenoid portion includes a tubular coil portion, a magnetic yoke having a side surface portion and a bottom portion, a columnar plunger, a shaft, a stator core having a core shaft hole for sliding the plunger in the axial direction, and a base portion having a base shaft hole. In a radial thickness of the sleeve, a thickness of a part corresponding to an end outer peripheral surface is smaller than a thickness of a sliding portion of an inner peripheral surface of the sleeve, which is a portion on which the valve body slides.

4 Claims, 8 Drawing Sheets

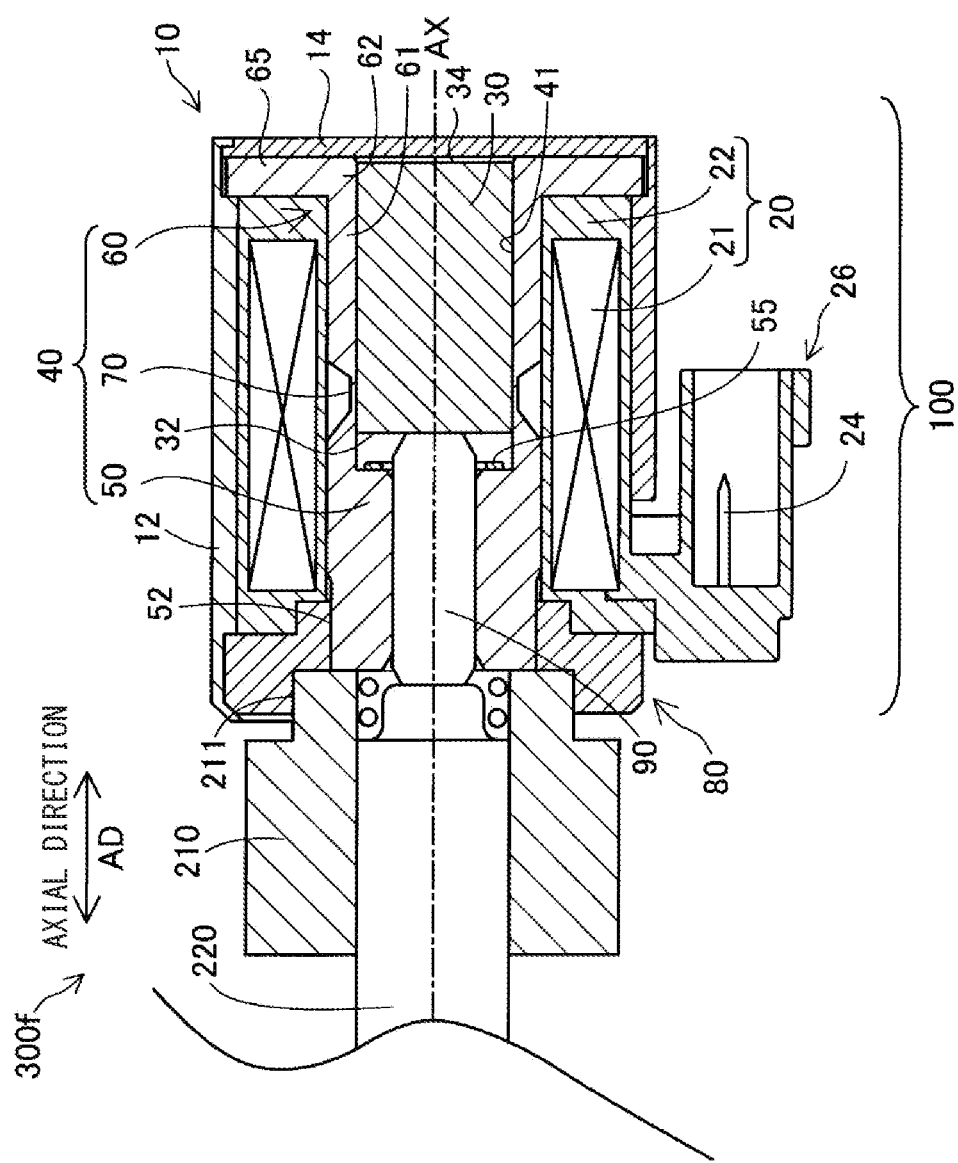

SOLENOID VALVE

CROSS REFERENCE TO RELATED APPLICATION

The present application is based on Japanese Patent Application No. 2020-155322 filed on Sep. 16, 2020, disclosure of which is incorporated herein by reference.

TECHNICAL FIELD

The present disclosure relates to a solenoid valve.

BACKGROUND

Conventionally, a solenoid valve includes a solenoid portion in which a plunger slides inside a stator core and a valve portion having a sleeve into which a valve body is inserted inside a coil that generates a magnetic force by energization.

SUMMARY

According to one embodiment of the present disclosure, a solenoid valve includes a valve portion and a solenoid portion.

The valve portion has a tubular sleeve extending along an axial direction and a valve body inserted into the sleeve and sliding in the axial direction.

The solenoid portion includes a tubular coil portion that generates magnetic force when energized, a magnetic yoke that have a side surface portion along the axial direction and a bottom portion formed along a direction intersecting the axial direction, and that accommodates the coil portion, a columnar plunger that slides in the axial direction, a shaft that is arranged between the plunger and the valve body in the axial direction and that moves the valve body in the axial direction according to the sliding of the plunger, a stator core that has a core shaft hole formed in the axial direction, accommodates at least a part of the shaft and the plunger in the core shaft hole, and slides the plunger in the axial direction by the magnetic force generated by the coil portion, and a base portion made of a cylindrical magnetic material and having a base shaft hole.

A sleeve end portion, which is an end portion of the sleeve on a solenoid portion side in the axial direction, is accommodated in the base shaft hole, and an end outer peripheral surface, which is an outer peripheral surface of the sleeve end portion, is fastened. A core end portion, which is an end portion of the stator core on a valve portion side in the axial direction, is accommodated in the base shaft hole and is in contact with the yoke.

In a radial thickness of the sleeve, a thickness of a part corresponding to the end outer peripheral surface is smaller than a thickness of a sliding portion of an inner peripheral surface of the sleeve, which is a portion on which the valve body slides.

The present disclosure can be realized as the following embodiments. For example, the present disclosure can be realized in the embodiment of a solenoid valve, a method of manufacturing a solenoid, and the like.

BRIEF DESCRIPTION OF DRAWINGS

FIG. 8 is a schematic view for explaining a schematic configuration of a solenoid valve of other embodiment.

DETAILED DESCRIPTION

Figure 1:
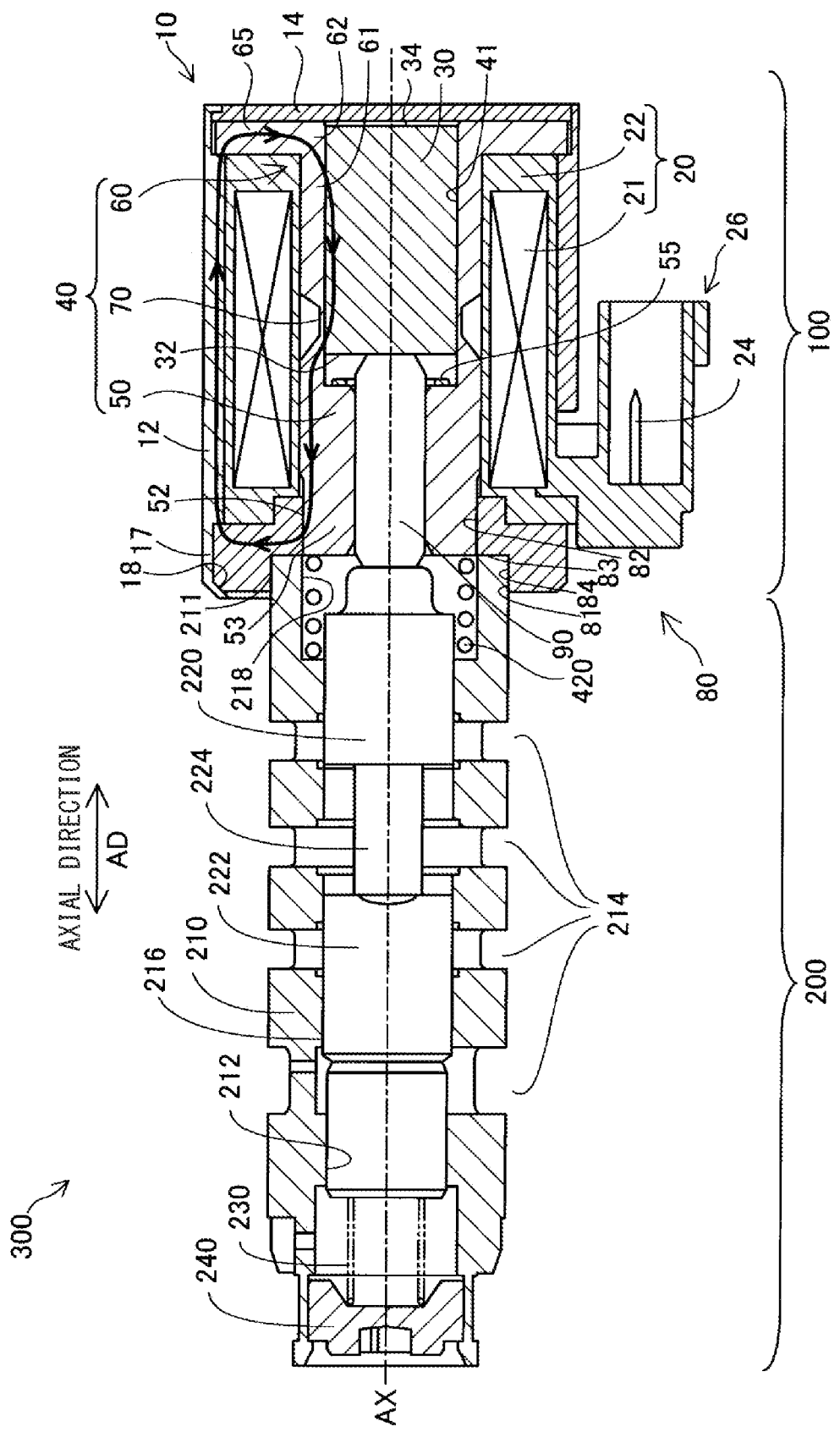
FIG. 1 is a cross-sectional view showing a schematic configuration of a solenoid valve according to a first embodiment.

In an assumable example, a solenoid valve includes a solenoid portion in which a plunger slides inside a stator core and a valve portion having a sleeve into which a valve body is inserted inside a coil that generates a magnetic force by energization. In the solenoid valve, a flange portion formed on the sleeve and a yoke of the solenoid portion are fastened by caulking so that the solenoid portion and the valve portion are fixed.

However, a sleeve sliding portion may be deformed due to a radial stress generated when the sleeve is fastened to the solenoid portion. As a result, a gap between the sleeve and the valve body that is inserted into the sleeve and slides in an axial direction is reduced, and it may cause sliding failure of the valve body. Such a problem may occur not only when the flange portion formed on the sleeve and the yoke of the solenoid portion are fastened by caulking, but also when they are fastened by press fitting. That is, the sleeve sliding portion may be deformed at the time of press fitting, and the above-mentioned gap may be reduced. Further, the above problem may occur even when the sleeve and the flange portion are formed separately. Therefore, a technique capable of suppressing the deformation of the sleeve sliding portion and suppressing the sliding failure of the valve body is desired.

The present disclosure can be realized as the following embodiments.

According to one embodiment of the present disclosure, a solenoid valve includes a valve portion and a solenoid portion. The valve portion has a tubular sleeve extending along an axial direction and a valve body inserted into the sleeve and sliding in the axial direction.

The solenoid portion includes a tubular coil portion that generates magnetic force when energized, a magnetic yoke that have a side surface portion along the axial direction and a bottom portion formed along a direction intersecting the axial direction, and that accommodates the coil portion, a columnar plunger that slides in the axial direction, a shaft that is arranged between the plunger and the valve body in the axial direction and that moves the valve body in the axial direction according to the sliding of the plunger, a stator core that has a core shaft hole formed in the axial direction, accommodates at least a part of the shaft and the plunger in the core shaft hole, and slides the plunger in the axial direction by the magnetic force generated by the coil portion, and a base portion made of a cylindrical magnetic material and having a base shaft hole.

A sleeve end portion, which is an end portion of the sleeve on a solenoid portion side in the axial direction, is accommodated in the base shaft hole, and an end outer peripheral surface, which is an outer peripheral surface of the sleeve end portion, is fastened, A core end portion, which is an end portion of the stator core on a valve portion side in the axial direction, is accommodated in the base shaft hole and is in contact with the yoke.

In a radial thickness of the sleeve, a thickness of a part corresponding to the end outer peripheral surface is smaller than a thickness of a sliding portion of an inner peripheral surface of the sleeve, which is a portion on which the valve body slides.

According to the solenoid valve of the embodiment described above, in the radial thickness of the sleeve, the thickness of the part corresponding to the end outer peripheral surface is smaller than the thickness of the sliding portion which is a portion of the inner peripheral surface of the sleeve on which the valve body slides. In the sleeve, the rigidity of the press-fitting portion to be fastened to the base portion can be made smaller than that of the sliding portion. Therefore, the deformation of the sleeve at the time of fastening is likely to occur at the press-fitting portion, and the deformation of the sleeve sliding portion can be suppressed. As a result, sliding defects of the valve body can be suppressed.

A. First Embodiment

A-1. Configuration

A solenoid valve 300 of a first embodiment shown in FIG. 1 is a linear solenoid valve, which is used to control the hydraulic pressure of hydraulic oil supplied to an automatic transmission for vehicles (not shown), and is mounted on a valve body provided on an outer surface of a transmission case (not shown). FIG. 1 schematically shows a cross section of the solenoid valve 300 taken along a central axis AX.

The solenoid valve 300 includes a valve portion 200 and a solenoid portion 100 arranged side by side along the central axis AX. FIG. 1 shows the solenoid valve 300 in a non-energized state. The solenoid valve 300 of the present embodiment is a normally closed type, but may be a normally open type.

The valve portion 200 shown in FIG. 1 adjusts an opening area of a plurality of oil ports 214 described later. The valve portion 200 includes a sleeve 210, a valve body 220, a spring 230, and a spring load adjusting member 240.

The sleeve 210 has a substantially cylindrical external shape. The sleeve 210 extends along a direction parallel to the central axis AX (hereinafter, also referred to as "axial direction AD"). In the following, a direction from the solenoid portion 100 side to the valve portion 200 side toward the axial direction AD is referred to as "tip side direction", and a direction from the valve portion 200 side toward the solenoid portion 100 side toward the axial direction AD is referred to as "base end side direction". The sleeve 210 is formed with an insertion hole 212 penetrating along the central axis AX and a plurality of oil ports 214 communicating with the insertion hole 212 and opening in a radial direction. The valve body 220 is inserted into the insertion hole 212. An end of the insertion hole 212 on the solenoid portion 100 side is formed to have an enlarged diameter and functions as an elastic member accommodating portion 218. An elastic member 420 described later is accommodated in the elastic member accommodating portion 218. The plurality of oil ports 214 are formed side by side along the axial direction AD. The plurality of oil ports 214 function as, for example, an input port, an output port, a feedback port, a drain port, and the like. The input port communicates with an oil pump (not shown) to receive a hydraulic pressure. The output port communicates with a clutch piston (not shown) to supply a hydraulic pressure. The feedback port applies a load to the valve body 220 based on the output hydraulic pressure. The drain port discharges the hydraulic oil. An end outer peripheral surface 211 of the end portion on the solenoid portion 100 side in the axial direction AD of the sleeve 210 is fastened to the inside of the base portion 80 described later. In the present embodiment, the radial direction means a direction orthogonal to the axial direction AD.

The valve body 220 has a plurality of large-diameter portions 222 and small-diameter portion 224 arranged side by side along the axial direction AD, and has a substantially rod-like external shape. The valve body 220 slides along the axial direction AD inside the insertion hole 212, and adjusts the opening area of the plurality of oil ports 214 according to a position along the axial direction AD between the large-diameter portion 222 and the small-diameter portion 224. A shaft 90 for transmitting the thrust of the solenoid portion 100 to the valve body 220 is in contact with one end of the valve body 220. The spring 230 is arranged at the other end of the valve body 220. The spring 230 is configured by a compression coil spring, and presses the valve body 220 in the axial direction AD to urge the valve body 220 toward the solenoid portion 100. The spring load adjusting member 240 is arranged in contact with the spring 230, and adjusts the spring load of the spring 230 by adjusting an amount of screwing into the sleeve 210.

The solenoid portion 100 is controlled by an electronic control device (not shown), and functions as an actuator that drives the valve portion 200 by being energized. The solenoid portion 100 includes a yoke 10, a coil 20, a plunger 30, a stator core 40, a base portion 80, and the elastic member 420.

The yoke 10 is made of a magnetic metal, and forms an outer shell of the solenoid portion 100 as shown in FIG. 1. The yoke 10 has a bottomed cylindrical external shape, and accommodates the coil 20, the plunger 30, and the stator core 40. The yoke 10 has a side surface portion 12, a bottom portion 14, a thin wall portion 17, and an opening portion 18.

The side surface portion 12 has a substantially cylindrical external shape along the axial direction AD, and is disposed radially outside the coil 20. The thin wall portion 17 is connected to an end of the side surface portion 12 on the valve portion 200 side and is a portion having a thickness smaller than that of the side surface portion 12. The thin wall portion 17 constitutes the opening portion 18 of the yoke 10. The thin wall portion 17 is in contact with the base portion 80, which will be described in detail later, and is fixed to the base portion 80.

The bottom portion 14 is an end of the side surface portion 12, is connected to the end on the side opposite to the valve portion 200 side, is formed perpendicular to the axial direction AD, and closes the end of the side surface portion 12. The bottom portion 14 faces a base end surface 34 of the plunger 30 described later.

The coil 20 has a tubular shape and is arranged inside the side surface portion 12 of the yoke 10 in the radial direction. The coil 20 generates a magnetic force when it is energized.

The coil 20 generates a loop-shaped magnetic flux passing through the side surface portion 12 of the yoke 10, the bottom portion 14 of the yoke 10, the stator core 40, the plunger 30, and the base portion 80 (hereinafter, also referred to as "magnetic circuit C1"). For convenience of explanation, a part of the magnetic circuit C1 formed when the coil 20 is energized is schematically shown by a thick arrow in FIG. 1.

The coil 20 has a winding portion 21 and a bobbin 22. The winding portion 21 is formed of a conducting wire having an insulating coating. The bobbin 22 is made of a resin. The bobbin 22 is connected to a connector 26 arranged on the outer periphery of the yoke 10. A connection terminal 24 to which the end of the winding portion 21 is connected is arranged inside the connector 26. The connector 26 electrically connects the solenoid portion 100 to the electronic control device via a connection line (not shown).

The plunger 30 has a substantially cylindrical external shape and is made of a magnetic metal. The plunger 30 is located inside a sliding core 60 in the radial direction. The plunger 30 slides in the axial direction AD on an inner peripheral surface of a core portion 61 of the stator core 40 described later. The above-described shaft 90 is disposed in contact with an end surface of the plunger 30 on the valve portion 200 side (hereinafter, also referred to as a "distal end surface 32"). Thereby, the plunger 30 is urged toward the bottom portion 14 side of the yoke 10 along the axial direction AD by the urging force of the spring 230 transmitted to the valve body 220 shown in FIG. 1. As shown in FIG. 1, an end surface of the plunger 30 opposite to the distal end surface 32 (hereinafter, also referred to as a "base end surface 34") faces the bottom portion 14 of the yoke 10. A breathing hole (not shown) penetrating the axial AD is formed inside the plunger 30. The breathing hole allows fluids such as hydraulic oil and air, which are located on the base end surface 34 side and the distal end surface 32 side of the plunger 30, to flow.

The Stator core 40 is made of a magnetic metal, and is disposed between the coil 20 and the plunger 30. The stator core 40 is formed with a core shaft hole 41 in the axial direction AD. The core shaft hole 41 has a two-stage shaft hole having a small diameter and a large diameter arranged along the axial direction AD. The core shaft hole 41 accommodates a part of the shaft 90 in a small-diameter shaft hole, and accommodates the plunger 30 in a large-diameter shaft hole. The stator core 40 slides the plunger 30 in the axial direction AD by the magnetic force generated by the coil 20. The stator core 40 is configured by a member in which a magnetic attraction core 50, a sliding core 60, and a magnetic flux passage suppressing portion 70 are integrated.

The magnetic attraction core 50 is disposed so as to surround the shaft 90 in a circumferential direction. The magnetic attraction core 50 constitutes a portion of the stator core 40 on the valve portion 200 side, and magnetically attracts the plunger 30 by the magnetic force generated by the coil 20. A stopper 55 is disposed on a surface of the magnetic attraction core 50 facing the distal end surface 32 of the plunger 30. A radial length of the stopper 55 is smaller than the radial length of the plunger 30. The stopper 55 is made of a non-magnetic material, and suppresses a direct contact between the plunger 30 and the magnetic attraction core 50, and also prevents the plunger 30 from being separated from the magnetic attraction core 50 due to the magnetic attraction.

The sliding core 60 constitutes a portion of the stator core 40 on the bottom portion 14 side, and is disposed radially outside the plunger 30. The sliding core 60 has a core portion 61 and a magnetic flux transfer portion 65.

The core portion 61 has a substantially cylindrical external shape, and is disposed between the coil 20 and the plunger 30 in the radial direction orthogonal to the axial direction AD. The core portion 61 guides the movement of the plunger 30 along the axial direction AD. As a result, the plunger 30 slides directly on an inner peripheral surface of the core portion 61. An end portion of the sliding core 60 that is located on an opposite side to the magnetic attraction core 50 side (hereinafter, also referred to as a "first core end portion 62") is in contact with the bottom portion 14.

The magnetic flux transfer portion 65 is formed radially outward from the first core end portion 62 over the entire circumference of the first core end portion 62. Therefore, the magnetic flux transfer portion 65 is arranged between the bobbin 22 and the bottom portion 14 of the yoke 10 in the axial direction AD. The magnetic flux transfer portion 65 transfers magnetic flux between the yoke 10 and the plunger 30 via the core portion 61. The magnetic flux transfer portion 65 of the present embodiment transfers magnetic flux between the bottom portion 14 of the yoke 10 and the plunger 30. The magnetic flux transfer portion 65 may transfer magnetic flux between the side surface portion 12 of the yoke 10 and the plunger 30. The magnetic flux transfer portion 65 of the present embodiment is formed integrally with the core portion 61.

A magnetic flux passage suppressing portion 70 is formed between the magnetic attraction core 50 and the core portion 61 in the axial direction AD. The magnetic flux passage suppressing portion 70 suppresses the direct passage of magnetic flux between the core portion 61 and the magnetic attraction core 50. The magnetic flux passage suppressing portion 70 of the present embodiment is configured such that a radial thickness of the stator core 40 is formed to be thin, so that the magnetic resistance of the magnetic flux passage suppressing portion 70 is higher than that of the magnetic attraction core 50 and the core portion 61.

A base portion 80 is a substantially tubular magnetic material member, and a base shaft hole 84 is formed in the axial direction AD. The base shaft hole 84 has a two-stage shaft hole having a small diameter and a large diameter arranged along the axial direction AD. The small-diameter shaft hole of the base shaft hole 84 accommodates a part of the end portion on the valve portion 200 side (hereinafter, referred to as "second core end portion 53") of the stator core 40 in the axial direction AD, and a part of the shaft 90. The large-diameter shaft hole of the base shaft hole 84 accommodates an end portion (hereinafter referred to as "sleeve end portion") on the solenoid portion 100 side of the sleeve 210 in the axial direction AD, and the elastic member 420, and a part of the shaft 90.

The base portion 80 is fastened to the end outer peripheral surface 211, which is an outer peripheral surface of the sleeve end. The outer peripheral surface of the sleeve 210 means a first outer peripheral surface. The base portion 80 is arranged on the outer side in the radial direction of the outer peripheral surface (hereinafter, referred to as "second outer peripheral surface 52") of the magnetic attraction core 50, and abuts on the yoke 10 inside the yoke 10. In the present embodiment, the base portion 80 includes a first inner diameter portion 81, a second inner diameter portion 82 having an inner diameter smaller than that of the first inner diameter portion 81, and a connection surface 83 that connects the first inner diameter portion 81 and the second inner diameter portion 82 and is substantially parallel to the radial direction. In the present embodiment, the connection surface 83 is in contact with the end surface of the sleeve 210 on the solenoid portion 100 side in the axial direction AD. In the present embodiment, the base portion 80 is press-fitted into the end outer peripheral surface 211 at the first inner diameter portion 81 and fastened. Further, the base portion 80 is fitted to the second outer peripheral surface 52 at the second inner diameter portion 82. Further, in the present embodiment, the base portion 80 is in contact with the side surface portion 12 of the yoke 10 in the axial direction AD on the outer side in the radial direction and on the solenoid portion 100 side in the axial direction AD. The base portion 80 transfers a magnetic flux between the magnetic attraction core 50 of the stator core 40 and the side surface portion 12 of the yoke 10.

The elastic member 420 is accommodated in an elastic member accommodating portion 218 formed in the sleeve 210 of the valve portion 200 and urges the stator core 40 toward the bottom portion 14. The elastic member 420 is arranged in contact with the end surface of the magnetic attraction core 50 in the axial direction AD and on the side opposite to the plunger 30 side. In the present embodiment, the elastic member 420 is configured by a compression coil spring having a substantially cylindrical external shape. The end portion of the valve body 220 is inserted inside the elastic member 420 in the radial direction. Since the stator core 40 is urged in the axial direction AD toward the bottom portion 14 of the yoke 10 by the elastic member 420, the first magnetic flux transfer portion 65 is pressed against the bottom portion 14, and the magnetic flux transfer portion 65 is pressed to the bottom portion 14. Therefore, the loss of the magnetic flux transmitted from the bottom portion 14 of the yoke 10 to the magnetic flux transfer portion 65 is suppressed.

In the present embodiment, the yoke 10, the plunger 30, and the stator core 40 are each made of iron. They are not limited to iron, they may be composed of any magnetic material such as nickel and cobalt. In the present embodiment, plating is applied on the outer peripheral surface of the plunger 30. By such a plating treatment, the rigidity of the plunger 30 can be increased, and deterioration of slidability can be suppressed. Further, in the present embodiment, the yoke 10 is formed by press molding and the stator core 40 is formed by forging, but each may be formed by any molding method. For example, the yoke 10 may be integrated by caulking fixing, press-fitting fixing, or the like after the side surface portion 12 and the bottom portion 14 are formed separately from each other.

When power is supplied to the winding portion 21, the magnetic circuit C1 is formed inside the solenoid portion 100. The plunger 30 is drawn toward the magnetic attraction core 50 by the formation of the magnetic circuit C1 and slides on the inner peripheral surface of the core portion 61 in the axial direction AD. As the current flowing through the coil 20 increases, the magnetic flux density of the magnetic circuit C1 increases, and the stroke amount of the plunger 30 increases.

The shaft 90 that abuts on the distal end surface 32 of the plunger 30 is arranged between the plunger 30 and the valve body 220 in the axial direction AD. When the plunger 30 strokes toward the magnetic attraction core 50 side, the valve body 220 shown in FIG. 1 is pressed toward the spring 230 side. As a result, the opening area of the oil port 214 is adjusted, and a hydraulic pressure proportional to the value of the current flowing through the winding portion 21 is output.

Figure 2:
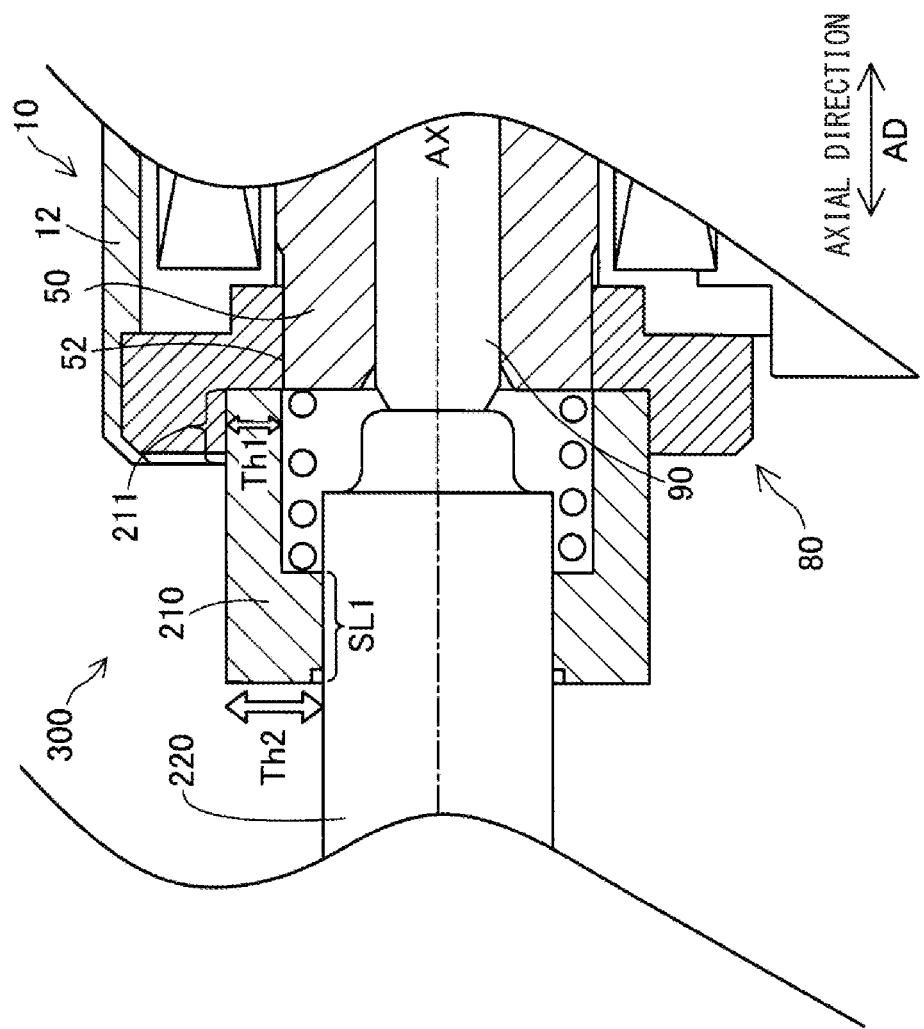
FIG. 2 is a schematic view for explaining a thickness of a sleeve of the solenoid valve according to the first embodiment.

As shown in FIG. 2, in the radial thickness of the sleeve 210, a thickness Th1 of the part corresponding to the end outer peripheral surface 211 is smaller than the thickness Th2 of the sliding portion SL1 which is a portion of the inner peripheral surface of the sleeve on which the valve body 220 slides. As a result, when the sleeve 210 is fastened to the base portion 80, the rigidity of the press-fitting portion to be fastened to the base portion 80 can be made smaller than that of the sliding portion SL1, and the deformation of the sleeve 210 at the time of fastening is likely to occur at the press-fitting portion, and the occurrence at the sliding portion SL1 can be suppressed. Therefore, a gap between the sleeve 210 and the valve body 220 that is inserted into the sleeve 210 and slides in the axial direction is reduced, and the sliding failure of the valve body 220 is suppressed. In FIG. 2, the configuration on the base end side direction of the solenoid portion 100 and the configuration on the tip side direction of the valve portion 200 are omitted, and a part of the solenoid portion 100 and a part of the valve portion 200 are shown.

The coil 20 of the present embodiment corresponds to the coil portion in the claims. The second core end portion 53 corresponds to the core end portion in the scope of the claims.

According to the solenoid valve 300 of the first embodiment described above, in the radial thickness of the sleeve 210, the thickness Th1 of the part corresponding to the end outer peripheral surface 211 is smaller than the thickness Th2 of the sliding portion SL1 which is a portion of the inner peripheral surface of the sleeve 210 on which the valve body 220 slides. In the sleeve, the rigidity of the press-fitting portion to be fastened to the base portion can be made smaller than that of the sliding portion. Therefore, the deformation of the sleeve at the time of fastening is likely to occur at the press-fitting portion, and the deformation of the sleeve sliding portion can be suppressed. As a result, sliding defects of the valve body can be suppressed.

B. Second Embodiment

Figure 3:
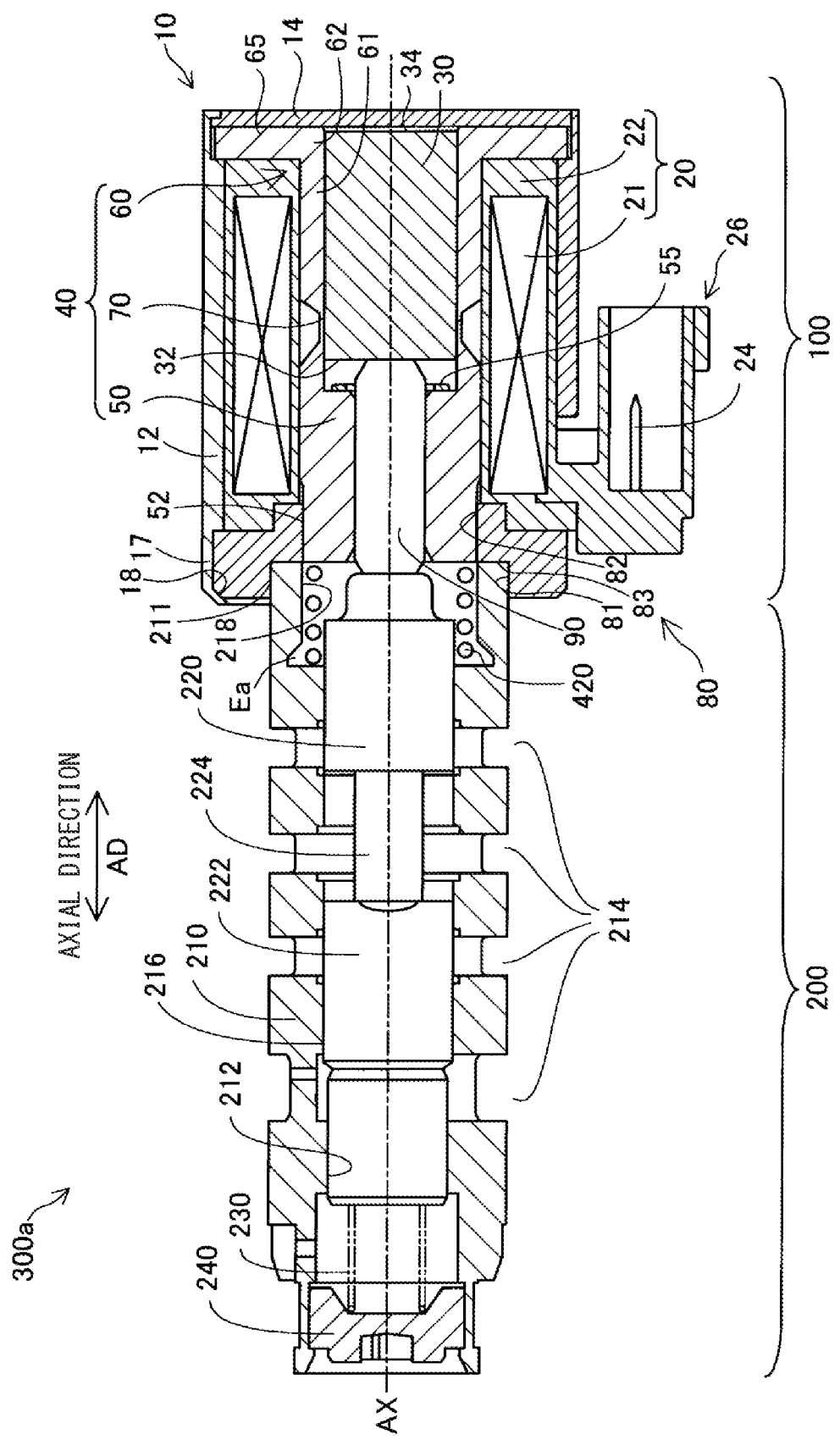
FIG. 3 is a cross-sectional view showing a schematic configuration of a solenoid valve according to a second embodiment.

As shown in FIG. 3, in a solenoid valve 300a of a second embodiment, a groove Ea having the radial direction as the depth direction is formed over the entire circumference in a portion continuous in the axial direction AD from the part corresponding to the end outer peripheral surface 211 to the sliding portion of the inner surface of the sleeve 210, and on end portion on the sliding portion side in the axial direction AD. It differs from the solenoid valve 300 of the first embodiment in this respect. Since the configuration of the solenoid valve 300a of the second embodiment other than this configuration is the same as the configuration of the solenoid valve 300 of the first embodiment, the same reference numerals are given and the description thereof will be omitted.

As shown in FIG. 3, of the inner peripheral surface 216 of the sleeve 210, the groove Ea having a radial direction as a depth direction is formed over the entire circumference on the end portion toward the tip end side of the inner peripheral surface extending in parallel with the axial direction AD from the part corresponding to the end outer peripheral surface 211 to the sliding portion side.

The solenoid valve 300a of the second embodiment described above has the same effect as the solenoid valve 300 of the first embodiment. In addition, in the solenoid valve 300a of the second embodiment, a groove Ea having the radial direction as the depth direction is formed over the entire circumference in a portion continuous in the axial direction AD from the part corresponding to the end outer peripheral surface 211 to the sliding portion of the inner surface of the sleeve 210, and on end portion on the sliding portion side in the axial direction AD. Therefore, in the sleeve 210, the rigidity of the press-fitting portion side to be fastened to the base portion 80 can be made smaller than the rigidity of the sliding portion, and the sleeve 210 can be more easily deformed to the press-fitting portion side at the time of fastening.

C. Third Embodiment

Figure 4:
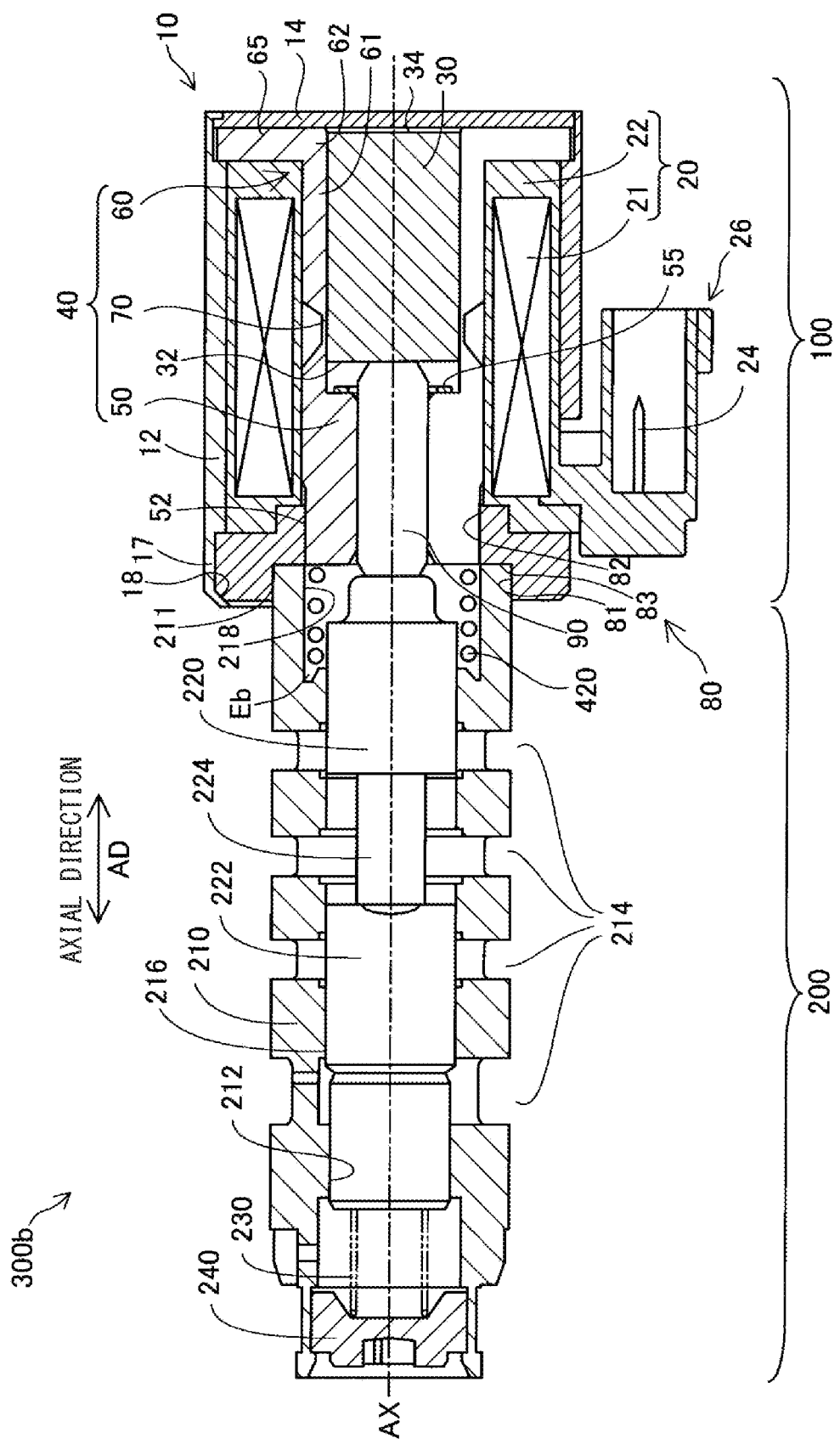
FIG. 4 is a cross-sectional view showing a schematic configuration of a solenoid valve according to a third embodiment.

As shown in FIG. 4, in a solenoid valve 300b of a third embodiment, a groove Eb having the axial direction AD as the depth direction is formed over the entire circumference in a portion continuous in the axial direction AD from the part corresponding to the end outer peripheral surface 211 to the sliding portion of the inner surface of the sleeve 210, and on end portion on the sliding portion side in the axial direction AD. It differs from the solenoid valve 300 of the first embodiment in this respect. Since the configuration of the solenoid valve 300b of the third embodiment other than this configuration is the same as the configuration of the solenoid valve 300 of the first embodiment, the same reference numerals are given and the description thereof will be omitted.

As shown in FIG. 4, of the inner peripheral surface 216 of the sleeve 210, the groove Eb having the axial direction AD as a depth direction is formed over the entire circumference on the end portion toward the tip end side of the inner peripheral surface extending in parallel with the axial direction AD from the part corresponding to the end outer peripheral surface 211 to the sliding portion side.

The solenoid valve 300b of the third embodiment described above has the same effect as the solenoid valve 300 of the first embodiment. In addition, in a solenoid valve 300b of the third embodiment, a groove Eb having the axial direction AD as the depth direction is formed over the entire circumference in a portion continuous in the axial direction AD from the part corresponding to the end outer peripheral surface 211 to the sliding portion of the inner surface of the sleeve 210, and on end portion on the sliding portion side in the axial direction AD. Therefore, in the sleeve 210, the rigidity of the press-fitting portion side to be fastened to the base portion 80 can be made smaller than the rigidity of the sliding portion, and the sleeve 210 can be more easily deformed to the press-fitting portion side at the time of fastening.

D. Fourth Embodiment

Figure 5:
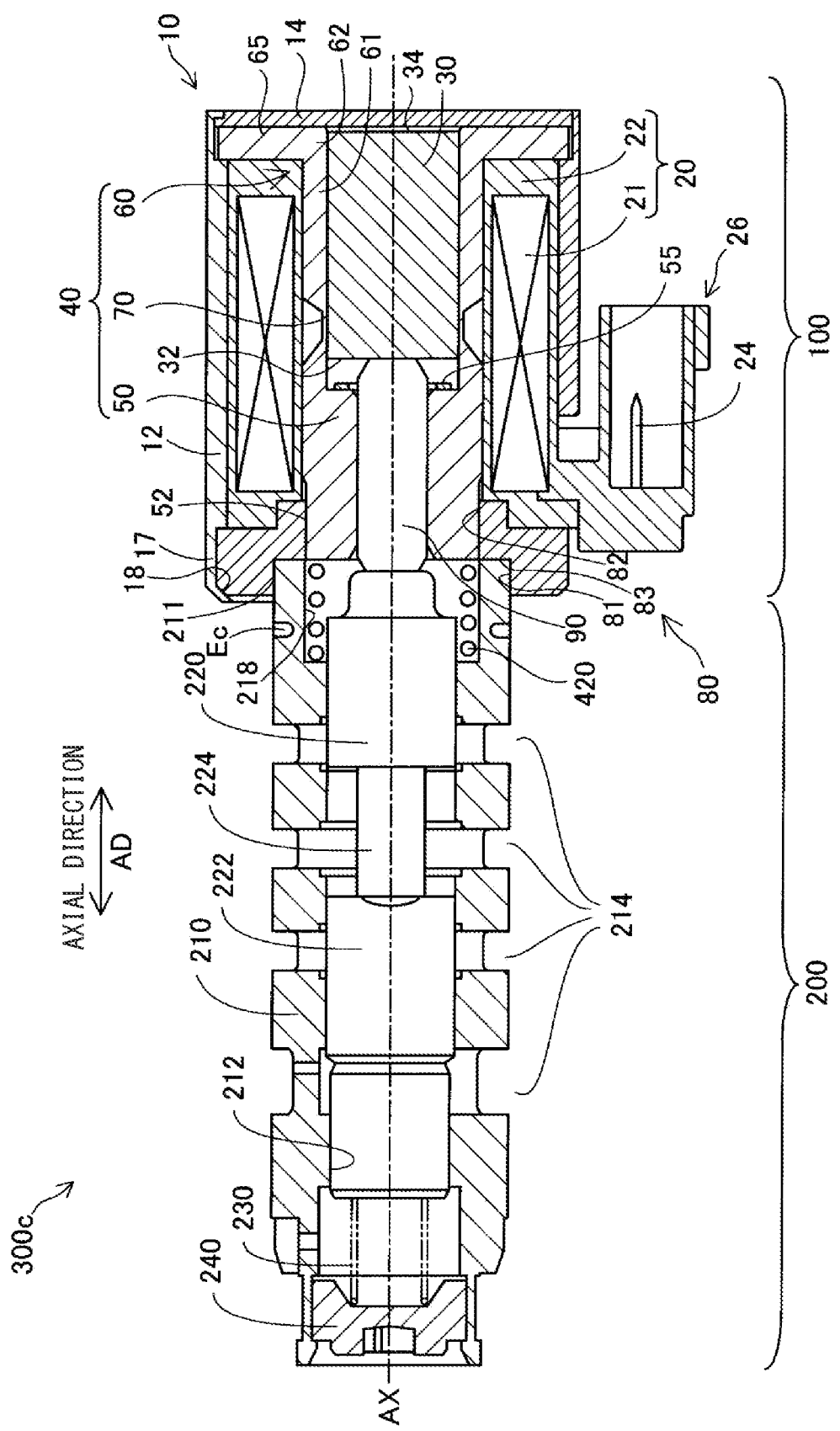
FIG. 5 is a cross-sectional view showing a schematic configuration of a solenoid valve according to a fourth embodiment.

As shown in FIG. 5, in the solenoid valve 300c of a fourth embodiment, a groove Ec recessed in the radial direction is formed on a first outer peripheral surface of the sleeve 210 over the entire circumference. It is different from the solenoid valve 300 of the first embodiment. Since the configuration of the solenoid valve 300c of the fourth embodiment other than this configuration is the same as the configuration of the solenoid valve 300 of the first embodiment, the same reference numerals are given and the description thereof will be omitted.

As shown in FIG. 5, a groove Ec is formed over the entire circumference in the radial direction at a position between the end portion of the end outer peripheral surface 211 on the sliding portion side and the part of the first outer peripheral surface of the sleeve 210 corresponding to the sliding portion on the solenoid portion 100 side in the base end side direction in the first outer surface of the sleeve 210.

The solenoid valve 300c of the fourth embodiment described above has the same effect as the solenoid valve 300 of the first embodiment. In addition, in the solenoid valve 300c of the fourth embodiment, the groove Ec is formed over the entire circumference in the radial direction at a position between the end portion of the end outer peripheral surface 211 on the sliding portion side and the part of the first outer peripheral surface of the sleeve 210 corresponding to the sliding portion on the solenoid portion 100 side in the base end side direction in the first outer surface of the sleeve 210. Therefore, in the sleeve 210, the rigidity of the press-fitting portion side to be fastened to the base portion 80 can be made smaller than the rigidity of the sliding portion, and the sleeve 210 can be more easily deformed to the press-fitting portion side at the time of fastening.

E. Fifth Embodiment

Figure 6:
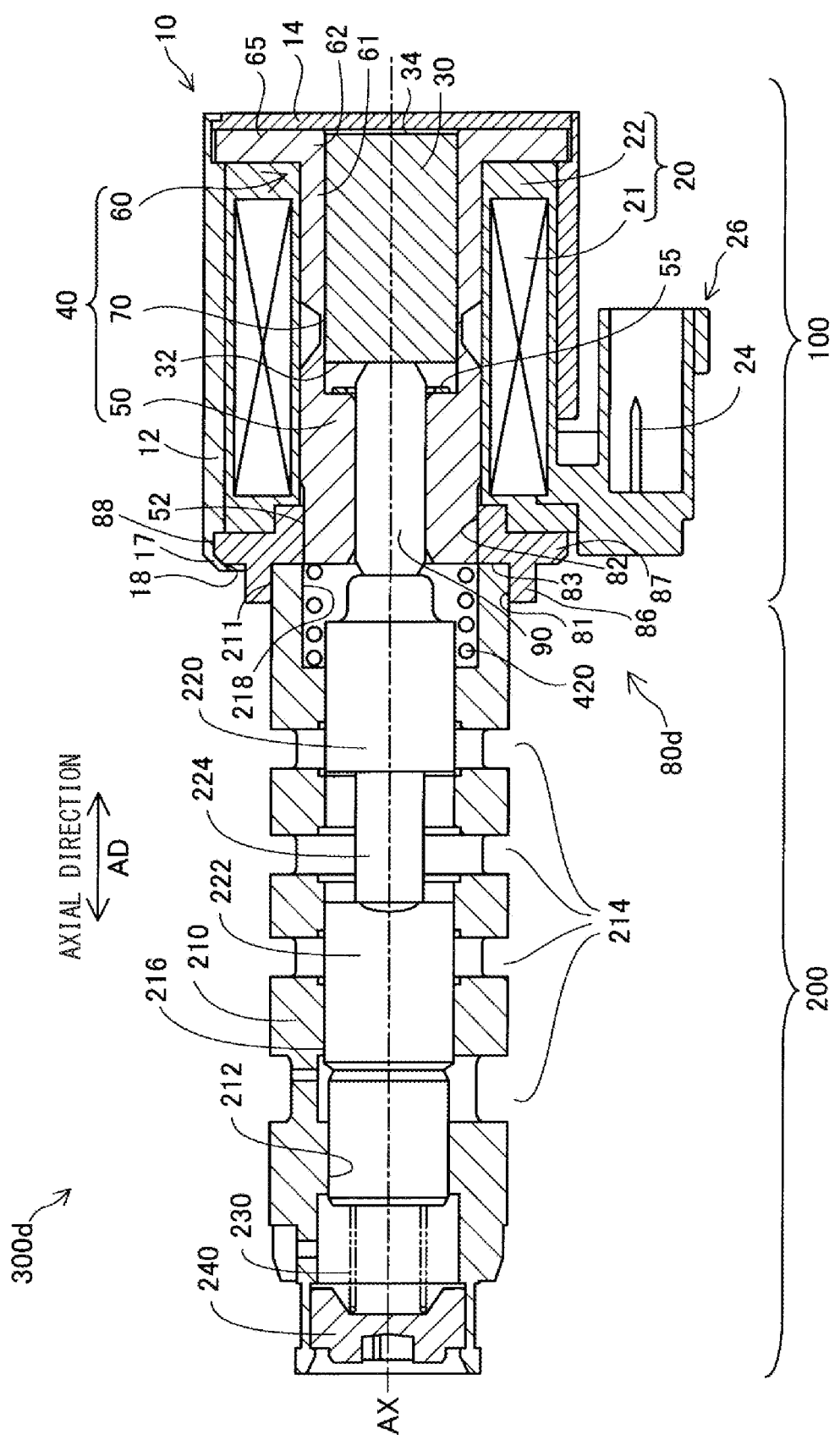
FIG. 6 is a cross-sectional view showing a schematic configuration of a solenoid valve according to a fifth embodiment.

As shown in FIG. 6, the solenoid valve 300d of the fifth embodiment includes a base portion 80d having a first tubular portion 86 and a flange portion 87, and this point is different from the solenoid valve 300 of the first embodiment. Since the configuration of the solenoid valve 300d of the fifth embodiment other than this configuration is the same as the configuration of the solenoid valve 300 of the first embodiment, the same reference numerals are given and the description thereof will be omitted.

As shown in FIG. 6, the base portion 80d is a substantially tubular magnetic material member, and has the first tubular portion 86 and the flange portion 87 protruding in the axial direction AD with respect to the first tubular portion 86. The end portion of the sleeve is press-fitted to the first tubular portion 86, and the end outer peripheral surface 211 is fastened to the first tubular portion 86. The flange portion 87 is protruded in the axial direction AD with respect to the first tubular portion 86, and has an outer diameter larger than the outer diameter of the first tubular portion 86. The flange portion 87 is arranged on the outer side in the radial direction of the second outer peripheral surface 52 of the magnetic attraction core 50, and abuts on the yoke 10 inside the yoke 10. In the present embodiment, the inner diameter of the first tubular portion 86 is larger than the inner diameter of the flange portion 87. An outer peripheral surface 88 of the flange portion 87 is caulked and fixed to the thin wall portion 17 of the yoke 10.

The solenoid valve 300d of the fifth embodiment described above has the same effect as the solenoid valve 300 of the first embodiment. In addition, in the solenoid valve 300d of the fifth embodiment, the base portion 80 further has the first tubular portion 86 having a smaller radial thickness and the flange portion 87 having a larger radial thickness than the first tubular portion. Therefore, the rigidity of the base portion 80 side becomes small. As a result, deformation of the sleeve 210 at the time of fastening is likely to occur on the outer diameter side of the press-fitting portion of the base portion 80 rather than the inner diameter side of the sleeve 210.

Figure 7:
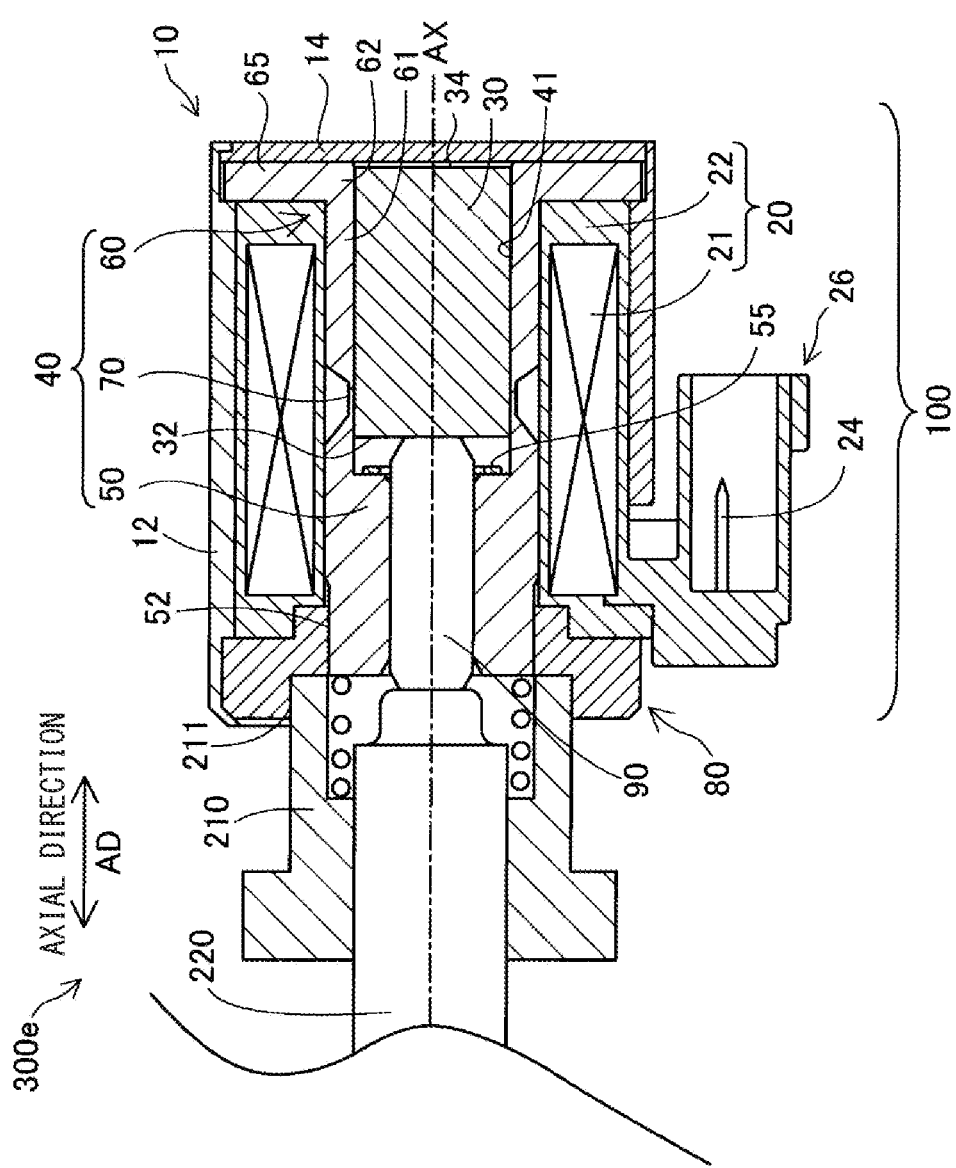
FIG. 7 is a schematic view for explaining a schematic configuration of a solenoid valve of other embodiment.

F. Other Embodiments (F1) In the solenoid valve 300 of the first embodiment, the outer diameter of the sleeve 210 at the fastening portion with the base portion 80 and the outer diameter of the sleeve 210 corresponding to the sliding portion of the valve body 220 are substantially the same. However, this disclosure is not limited to this configuration. As shown in the solenoid valve 300e of FIG. 7, the outer diameter of the sleeve 210 at the fastening portion with the base portion 80 may be smaller than the outer diameter of the sleeve 210 at the part corresponding to the sliding portion of the valve body 220. Also in this configuration, as shown in FIG. 7, in the radial thickness of the sleeve 210, the thickness of the part corresponding to the end outer peripheral surface 211 is smaller than the thickness of the sliding portion, which is the portion of the inner peripheral surface of the sleeve 210 on which the valve body 220 slides. Therefore, the same effect as that of the solenoid valve 300 of the first embodiment can be obtained. In FIG. 7, the configuration on the tip side direction of the valve portion 200 are omitted, and the solenoid portion 100 and a part of the valve portion 200 are shown.

(F2) In the solenoid valve 300 of the first embodiment, the inner diameter of the sleeve 210 at the fastening portion with the base portion 80 was larger than the inner diameter of the sleeve 210 at the part corresponding to the sliding portion of the valve body 220. The present disclosure is not limited to this configuration. As shown in the solenoid valve 300f of FIG. 8, the inner diameter of the sleeve 210 at the fastening portion with the base portion 80 may be the same as the inner diameter of the sleeve 210 at the part corresponding to the sliding portion of the valve body 220. Also in this configuration, as shown in FIG. 8, in the radial thickness of the sleeve 210, the thickness of the part corresponding to the end outer peripheral surface 211 is smaller than the thickness of the sliding portion, which is the portion of the inner peripheral surface of the sleeve 210 on which the valve body 220 slides. Therefore, the same effect as that of the solenoid valve 300 of the first embodiment can be obtained. In FIG. 8, the configuration on the tip side direction of the valve portion 200 are omitted, and the solenoid portion 100 and a part of the valve portion 200 are shown.

(F3) In the solenoid valve 300a of the second embodiment and the solenoid valve 300b of the third embodiment, the grooves Ea and Eb are formed over the entire circumference, but instead, they may be formed only on a part of the entire circumference.

(F4) In the solenoid valve 300c of the fourth embodiment, the groove Ec is formed over the entire circumference, but instead, it may be formed only on a part of the entire circumference. Further, the groove Ec in the radial direction may be located at any position between the end portion of the end outer peripheral surface 211 on the sliding portion side and the end portion of the outer peripheral surface of the sleeve 210 on the end outer peripheral surface 211 in the base end side direction, which corresponds to the sliding portion on the solenoid portion 100 side.

(F5) In the solenoid valve 300d of the fifth embodiment, the flange portion 87 accommodates a part of the end portion of the magnetic attraction core 50 on the valve portion 200 side, but the present disclosure is not limited to this configuration. The flange portion 87 may entirely accommodate the end portion on the valve portion 200 side of the magnetic attraction core 50.

(F6) In the solenoid valve 300 of the first embodiment, the bottom portion 14 of the yoke 10 is formed perpendicular to the axial direction AD, but the present disclosure is not limited to this configuration. The bottom portion 14 of the yoke 10 may be formed along any direction intersecting the axial direction AD.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:
1. A solenoid valve, comprising:
a valve portion; and
a solenoid portion, wherein
the valve portion includes
a tubular sleeve extending along an axial direction, and
a valve body that is inserted into the sleeve and slides in the axial direction,
the solenoid portion includes
a tubular coil portion that generates magnetic force when energized,
a magnetic yoke that have a side surface portion along the axial direction and a bottom portion formed along a direction intersecting the axial direction, and that accommodates the coil portion,
a columnar plunger that slides in the axial direction,
a shaft that is arranged between the plunger and the valve body in the axial direction and that moves the valve body in the axial direction according to a sliding of the plunger,
a stator core that has a core shaft hole formed in the axial direction, accommodates at least a part of the shaft and the plunger in the core shaft hole, and slides the plunger in the axial direction by the magnetic force generated by the coil portion, and
a base portion made of a cylindrical magnetic material and having a base shaft hole,
a sleeve end portion, which is an end portion of the sleeve on a solenoid portion side in the axial direction, is accommodated in the base shaft hole, and an end outer peripheral surface, which is an outer peripheral surface of the sleeve end portion, is fastened,
a core end portion, which is an end portion of the stator core on a valve portion side in the axial direction, is accommodated in the base shaft hole,
in a radial thickness of the sleeve, a thickness of a first part of the sleeve located at the end outer peripheral surface is smaller than a thickness of a second part of the sleeve located at a sliding portion of an inner peripheral surface of the sleeve, which is a portion on which the valve body slides,
a space is provided between a radially inner side of the first part of the sleeve located at the end outer peripheral surface and the valve body so that the thickness of the first part of the sleeve is smaller than the thickness of the second part of the sleeve, and
the space, which is provided between the radially inner side of the first part of the sleeve located at the end outer peripheral surface and the valve body, is provided on an entire inner peripheral side of the first part of the sleeve located at the end outer peripheral surface that is fastened to an inner periphery of the cylindrical base portion.
2. The solenoid valve according to claim 1, wherein
a groove is formed on the inner peripheral surface of the sleeve, and on a part of the sleeve at an end portion on a sliding portion side in the axial direction in a portion continuous in the axial direction from the first part of the sleeve located at the end outer peripheral surface to the second part of the sleeve located at the sliding portion.

3. The solenoid valve according to claim 1, wherein a groove is formed in a radial direction at a position between the first part of the sleeve located at the end outer peripheral surface and the second part of the sleeve located at the sliding portion in the axial direction.

4. The solenoid valve according to claim 1, wherein the base portion includes a first tubular portion to which the end portion of the sleeve is press-fitted and the end outer peripheral surface is fastened, and a flange portion protruded in the axial direction with respect to the first tubular portion, and the flange portion has an outer diameter larger than an outer diameter of the first tubular portion, accommodates at least a part of the core end portion, and is in contact with the yoke.

* * * * *